(12) United States Patent
Kelley

(10) Patent No.: US 12,510,810 B1
(45) Date of Patent: *Dec. 30, 2025

(54) UNIVERSALLY ADJUSTING ULTRA SHORT THROW PROJECTOR CREDENZA

(71) Applicant: Michael Edward Kelley, San Angelo, TX (US)

(72) Inventor: Michael Edward Kelley, San Angelo, TX (US)

(*) Notice: Subject to any disclaimer, the term of this patent is extended or adjusted under 35 U.S.C. 154(b) by 385 days.

This patent is subject to a terminal disclaimer.

(21) Appl. No.: 17/962,529

(22) Filed: Oct. 9, 2022

Related U.S. Application Data

(63) Continuation-in-part of application No. 17/146,432, filed on Jan. 11, 2021, now Pat. No. 11,466,812.

(51) Int. Cl.
*G03B 21/10* (2006.01)
*G03B 21/58* (2014.01)

(52) U.S. Cl.
CPC ............. *G03B 21/10* (2013.01); *G03B 21/58* (2013.01)

(58) Field of Classification Search
CPC ...... F16M 11/02; F16M 11/048; F16M 11/16; F16M 11/18; F16M 11/24; F16M 11/42; F16M 11/242; G03B 21/003; G03B 21/10; G03B 21/16; G03B 21/20; G03B 21/62; G03B 21/145; G03B 21/147; G03B 21/208; H04N 9/3141; H04N 9/3144; H04N 9/3185; A47B 2220/0061; A47B 2220/0091
See application file for complete search history.

(56) References Cited

U.S. PATENT DOCUMENTS

| | | | | |
|---|---|---|---|---|
| 8,439,508 | B2 * | 5/2013 | Matsuo | G03B 37/04 345/1.3 |
| 10,288,989 | B2 * | 5/2019 | Nakayama | G03B 21/16 |
| 10,972,697 | B2 * | 4/2021 | Perelli | G03B 21/26 |

* cited by examiner

*Primary Examiner* — Sultan Chowdhury
(74) *Attorney, Agent, or Firm* — Bycer & Marion, PLC; Matthew L. Bycer

(57) ABSTRACT

Universally adjusting Ultra Short Throw (UST) projector credenza having a sliding UST compartment allowing for the cabinet to lie flush or near flush with a forward wall. The UST compartment expands out to a predetermined position to accommodate projecting images onto 100+ inch screens above. Each UST compartment comes with a cross-drilled and ventilated floating shelf that can be adjusted in three dimensions withing the compartment to allow adjustments. Ventilation holes in the shelf aerate the projector without obstructing ventilation. The UST compartment may have a low iron pane of glass over the projector to make it more discrete and hidden, but does not obstruct the image or color of the projected image passing through it in any way.

13 Claims, 12 Drawing Sheets

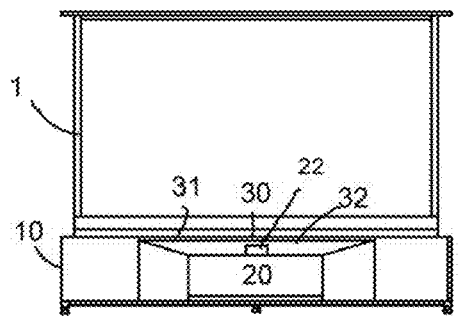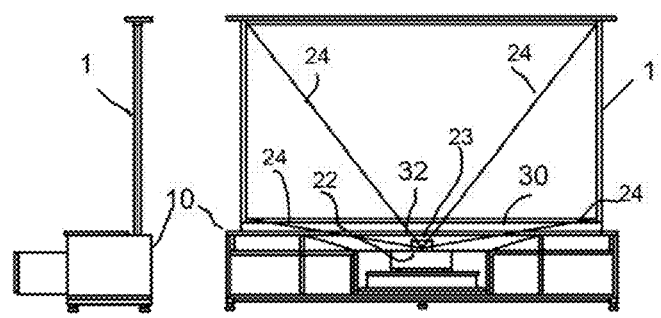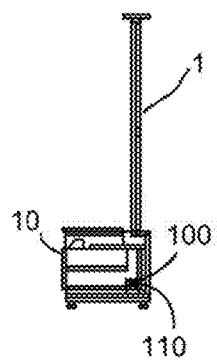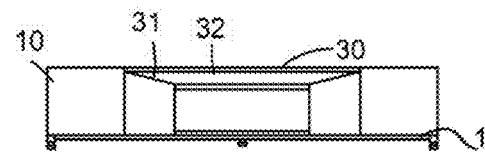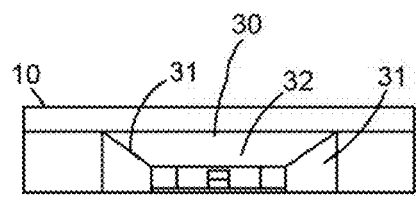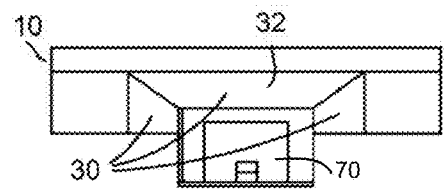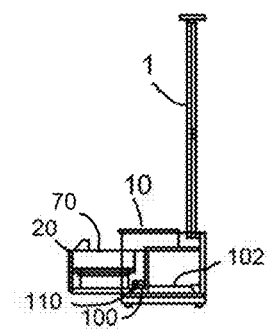

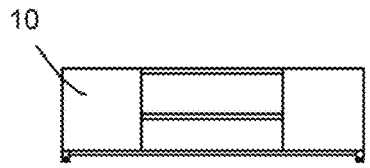
FIG.12A
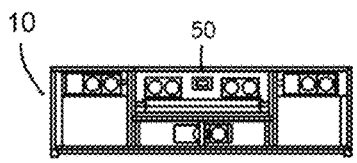
FIG.12B
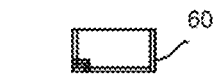
FIG.12C
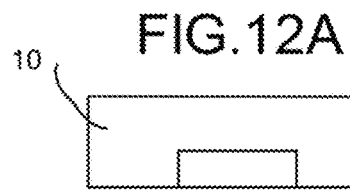
FIG.12D
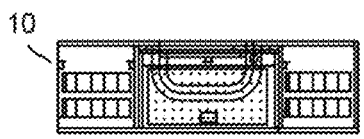
FIG.12E
FIG.12F
FIG.12G
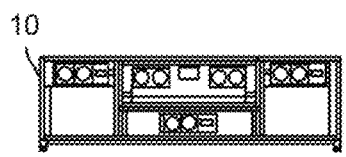
FIG.12H
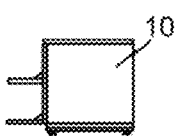
FIG.12I
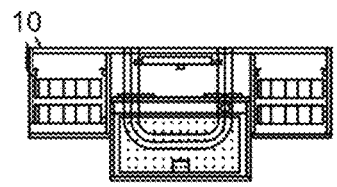
FIG.12J
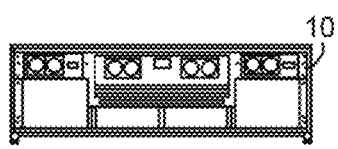
FIG.12K
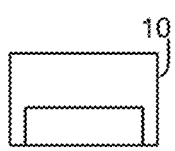
FIG.13A
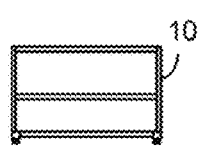
FIG.13B
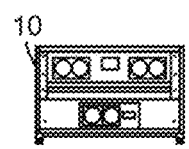
FIG.13C
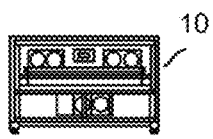
FIG.13D
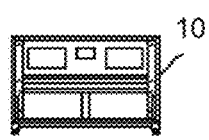
FIG.13E
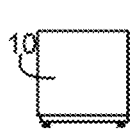
FIG.13F

UNIVERSALLY ADJUSTING ULTRA SHORT THROW PROJECTOR CREDENZA

CLAIM OF PRIORITY

The present application includes subject matter disclosed in and claims priority to a provisional application entitled "Universally Adjusting Ultra Short Throw Projector Credenza" filed Nov. 11, 2019 and assigned Ser. No. 62/933,782, and pending U.S. patent application entitled "Universally Adjusting Ultra Short Throw Projector Credenza" filed Jan. 11, 2021 and assigned Ser. No. 17/146,432 and U.S. Pat. No. 11,466,812, describing an invention made by the present inventor, herein incorporated by reference.

BACKGROUND OF THE INVENTION

1. Field of the Invention

The present invention relates to audio/visual entertainment systems. The present invention is more particularly directed to display systems utilizing ultra-short throw video projection systems.

2. Description of Related Prior Art

As is known in the art, ultra-short throw (UST) projectors have various predetermined throw ratios varying depending on projector design, style, and manufacturer specifications. Two companies dominate the market for manufacture UST credenzas to support or secure UST projectors. The current solution is a fixed credenza that houses the UST projector, or otherwise support an UST on a top surface of the cabinet. When projecting onto 100+ inches and larger screens, due to the throw ration, the UST must be pulled from the wall/screen and the cabinets are often set up away from the wall. In certain circumstances with long throw rations, or larger screen sizes, the UST is positioned well into the entertainment venue. In some cases, a cabinet could be set as much as two feet from the projection wall/screen. From an ergonomic design perspective, this impinges on the working and sound space in the entertainment room, impedes the owners living space, and aesthetically incorrect.

Current models offered are either custom made, or pre-manufactured for specific projectors, are not universal. When the UST is to be replaced or upgraded, or a different size screen is required, or the UST becomes obsolete, the supporting furniture cabinets are not adaptable, or upgradeable to the new design, and must also be replaced. (Example: 4K projection is replaced by 8K projection, and the customer wishes to upgrade his or her equipment to 8K, the cabinet design is only made for the obsolete projector and you have to buy a new cabinet).

Prior art ultra-short throw (UST) cabinets offer a low-profile credenza with built in rising screens. Sliding capability for a UST compartment has not been known, leading to credenza, and other further supporting the USTs to be positioned either too close, or away from the wall eating up space in the entertainment venue room.

The current cabinets available have to be pulled away from the wall substantially for larger UST projection images. They do not have cooling systems and components are exposed to outside particles that can get clogged into filters and heat sinks causing equipment to work harder and harder over its life span till it fails.

The current solution may be piece of furniture, preferably a credenza with a hole cut out of the top sized to the exact dimensions of the projector going in it, often with minimal space around the perimeter. They do not have any cooling, and do not protect the projector from dust intake. If the customer wants to achieve more than 100-inch projection, the cabinet has to be pulled substantially away from the wall.

Prior art cabinets offer low-profile compact cassette "sleeve" with built-in rising screens, but do not offer a sliding capability for their UST compartment, and therefore cannot be positioned close to the screen.

Speaker doors have yet been adopted in this functional furniture to remedy the issue of the UST projector AV equipment taking up the space where the center channel or peripheral AV equipment would traditionally go.

None of the current solutions offer a complete all-in-one AV/home theater UST projection credenza that can create from 100"-150" of display with full sound in thirty seconds.

It is therefore a primary object of the present invention to provide a display system that allows for flush or near flush positioning against a forward wall.

It is another object of the present invention provide a UST display system with climate, dust, and/or safety features.

These and other objects of the present invention will become apparent to those skilled in the art as the description thereof proceeds.

SUMMARY OF THE INVENTION

The present invention is directed to a complementary furniture system and UST with a universal sliding UST Projector compartment. A filtered climate-controlled cooling system may be designed to ensure the longevity of the equipment and projector inside through proper thermal and dust management. A magnetically-connected actuator drive safety feature may be employed to disengage in the event a safety event.

A manually or motorized ultra-short throw compartment on a wall mounted cabinet may slide out from the projection screen. A preferred embodiment includes a fixed, manually, or motorized floating shelf throw mantel for housing and supporting a UST, or may be a manually, or motorized floor mounted credenza with projector compartment, or may be a fixed, manually, or motorized dedicated universal cabinet.

A universal motorized UST compartment may include a cooling system designed to cool UST projectors. A UST compartment may be fully enclosed and projects images through low iron glass with and without anti-glare film. The UST compartment may be designed to fit all residential ultra-short throw projectors in production.

A chain actuator may be repurposed as an actuator to motorize the forward and backwards movement of the UST projector compartment, or a linear actuator for motorizing forward and backwards the movement may be employed.

A safety magnetic disengage designed to separate with approximately 10 lbs. of pressure in the event a child or adult gets their finger or hand between the UST projector compartment and the cabinet while closing, and self-re-engages with the actuator automatically when closed.

A low-profile rising screen cabinet may be used in conjunction with the motorized UST projector compartment to create an all in one 120"-150" Ultra Short Throw home theater.

An amphitheater style UST projector compartment may slide under the screen cassette to minimize cabinet depth when not in use, and prevents from obstructing projection when extended, and is capable of projecting onto a concealed rising 100"-150" ambient light rejecting (ALR) UST screen.

An ultra-slim high-performance speaker or speaker system may be built into the doors of cabinets embodying this invention, and may be positioned to avoid contact with AV equipment and UST projectors in the UST compartment behind them, allowing for a truly complete all-in-one AV/Home theater cabinet system.

A motorized UST enclosed or non-enclosed "sled", may provide for universal UST positioning and support. The system may be automated using Google Home and Amazon Echo, and offers 100"-150" of display from a cabinet that is only 14" tall.

A rising screen cassette "sleeve" style AV cabinets may be designed for 100"-150" rising ambient light rejecting UST screens that work in conjunction with the first ever motorized Ultra Short Throw (UST) sled.

A motorized Ultra Short Throw (UST) "shelf" may be designed to be mounted to any existing entertainment credenza that slides the projector out to compensate for throw ratio to make from 100"-150" of projection onto a wall mounted or hung Ambient Light Rejecting UST screens, and is designed to accommodate all UST projectors in production.

BRIEF DESCRIPTION OF THE DRAWINGS

The present invention will be described with greater specificity and clarity with reference to the following drawings, in which:

FIG. 1A illustrates a frontal view of a credenza and screen embodiment of the present invention with screen extended vertically upwards.

FIG. 1B illustrates a frontal view of the embodiment of FIG. 1A.

FIG. 1C illustrates a top view of the embodiment of FIG. 1A.

FIG. 1D illustrates a side view of the embodiment of FIG. 1A of credenza with projection slide extended and with screen extended vertically upwards.

FIG. 1E illustrates a partial cutaway frontal view of the embodiment of FIG. 1A of credenza with screen extended vertically upwards.

FIG. 1F illustrates a top view of the embodiment of FIG. 1A of credenza with projection slide extended.

FIG. 1G illustrates a cross-sectional side view of the embodiment of FIG. 1A.

FIG. 1H illustrates a cross-sectional side view of the embodiment of FIG. 1A of credenza with projection slide extended.

FIG. 12A illustrates a frontal view of a credenza embodiment of the present invention.

FIG. 12B illustrates a top view of the embodiment of FIG. 12A.

FIG. 12C illustrates a rear view of the embodiment of FIG. 12A.

FIG. 12D illustrates a side view of the embodiment of FIG. 12A with tail-gates open.

FIG. 12E illustrates a partial cutaway frontal view of the embodiment of FIG. 12A.

FIG. 12F illustrates a partial cutaway top view of the embodiment of FIG. 12A with sled retracted.

FIG. 12G illustrates a partial cutaway top view of the embodiment of FIG. 12A with sled extended.

FIG. 12H illustrates a partial cutaway rear view of the embodiment of FIG. 12A.

FIG. 12I illustrates a side view of the sled of embodiment of FIG. 12A.

FIG. 12J illustrates a partial cutaway frontal view of the sled of embodiment of FIG. 12A.

FIG. 12K illustrates a partial cutaway top view of the sled of embodiment of FIG. 12A.

FIG. 13A illustrates a top view of a credenza embodiment of the present invention.

FIG. 13B illustrates a front view of the embodiment of FIG. 13A.

FIG. 13C illustrates a rear view of the embodiment of FIG. 13A.

FIG. 13D illustrates a partial cut away front view of the embodiment of FIG. 13A.

FIG. 13E illustrates an alternative partial cut away front view of the embodiment of FIG. 13A.

FIG. 13F illustrates a right-side view of the embodiment of FIG. 13A.

DETAILED DESCRIPTION OF THE PREFERRED EMBODIMENTS

Figure 2A:
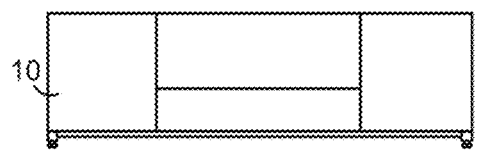
FIG. 2A illustrates a frontal view of a credenza system embodiment of the present invention.
Figure 2B:
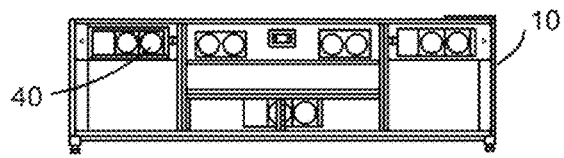
FIG. 2B illustrates a top view of the embodiment of FIG. 2A.
Figure 2C:
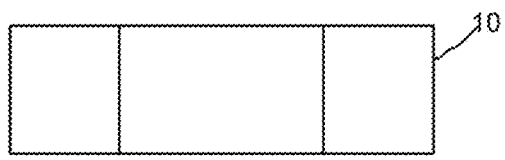
FIG. 2C illustrates a cross-sectional frontal view of the embodiment of FIG. 2A.
Figure 2D:
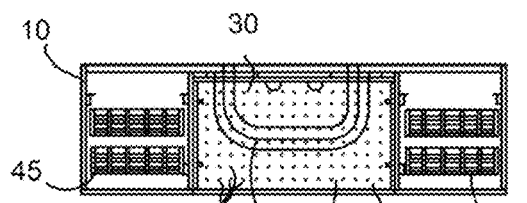
FIG. 2D illustrates a side view of the embodiment of FIG. 2A with tail-gates open.
Figure 2E:
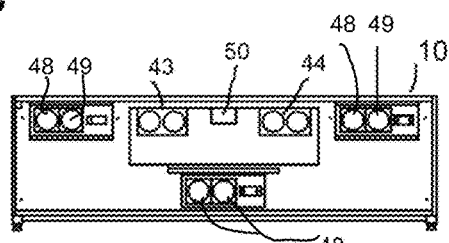
FIG. 2E illustrates a partial cutaway frontal view of the embodiment of FIG. 2A.
Figure 2F:
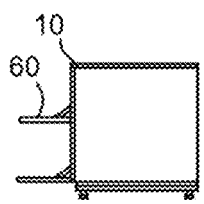
FIG. 2F illustrates a partial cutaway top view of the embodiment of FIG. 2A.
Figure 2G:
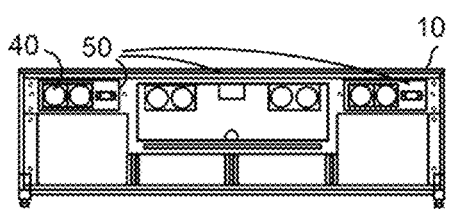
FIG. 2G illustrates a partial cutaway rear view of the embodiment of FIG. 2A.
Figure 3A:
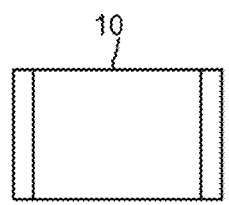
FIG. 3A illustrates a top view of a credenza embodiment of the present invention.
Figure 3B:
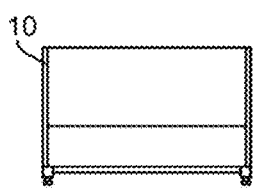
FIG. 3B illustrates a front view of the embodiment of FIG. 3A.
Figure 3C:
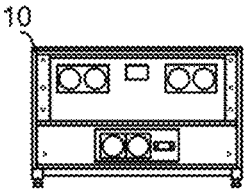
FIG. 3C illustrates a rear view of the embodiment of FIG. 3A.
Figure 3D:
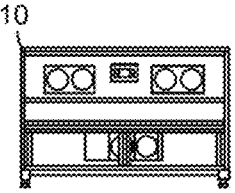
FIG. 3D illustrates a partial cut away front view of the embodiment of FIG. 3A.
Figure 3E:
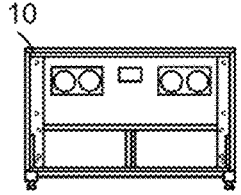
FIG. 3E illustrates an alternative partial cut away front view of the embodiment of FIG. 3A.
Figure 4A:
FIG. 4A illustrates a left side view of a credenza embodiment of the present invention with sled and screen extended.
Figure 4B:
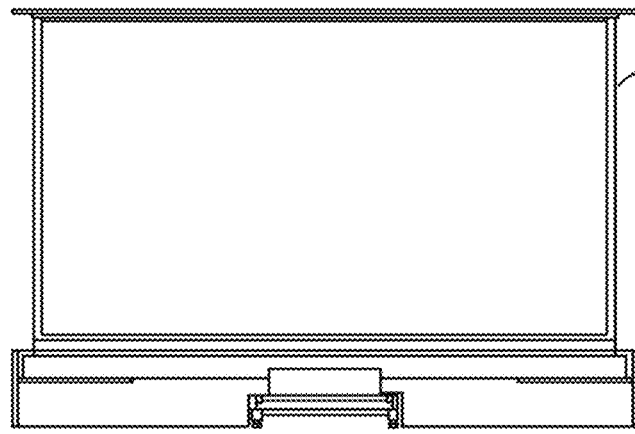
FIG. 4B illustrates a frontal view of the embodiment of FIG. 4A with screen extended.
Figure 4C:
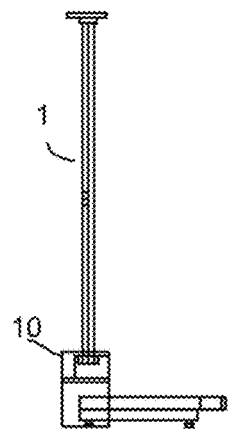
FIG. 4C illustrates a left side view of the embodiment of FIG. 4A with sled and screen extended.
Figure 4D:
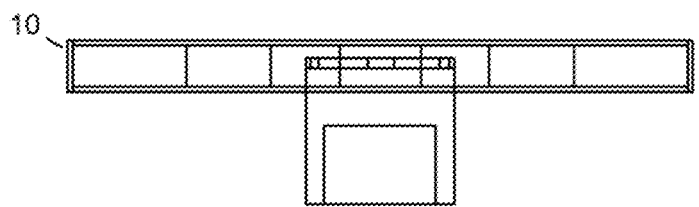
FIG. 4D illustrates a top view of the embodiment of FIG. 4A with screen extended.
Figure 4E:
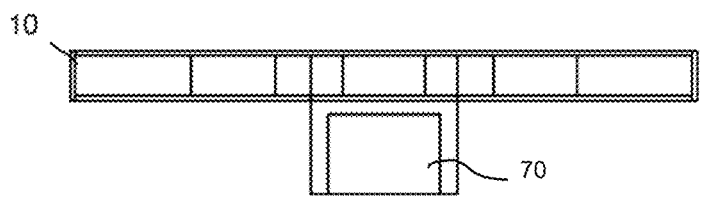
FIG. 4E illustrates a top view of the embodiment of FIG. 4A.
Figure 4F:
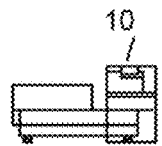
FIG. 4F illustrates a left side view of the embodiment of FIG. 4A with sled and screen retracted.
Figure 4G:
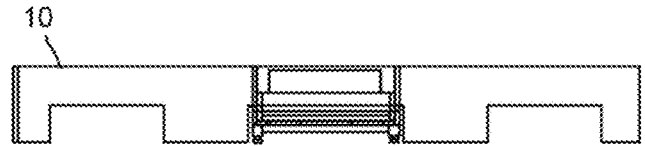
FIG. 4G illustrates a frontal view of the embodiment of FIG. 4A with screen retracted.
Figure 4H:
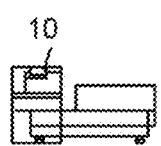
FIG. 4H illustrates a left side view of the embodiment of FIG. 4A with sled.
Figure 5A:
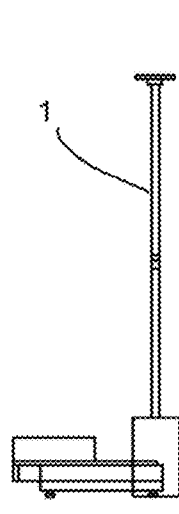
FIG. 5A illustrates a left side view of a credenza embodiment of the present invention lacking a projector with sled and screen extended.
Figure 5B:
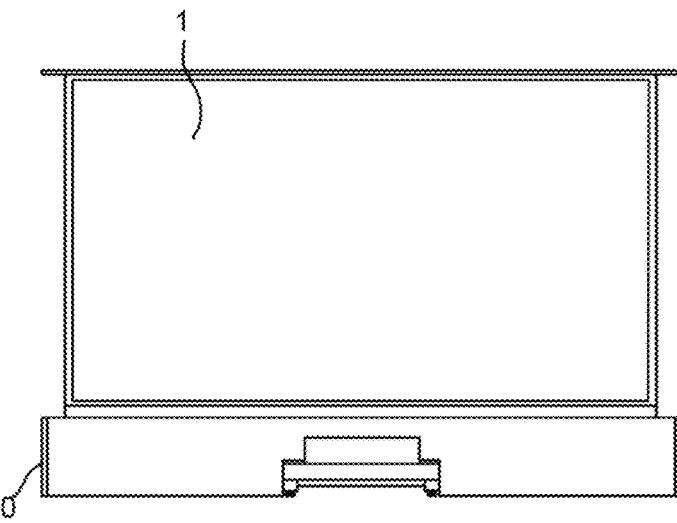
FIG. 5B illustrates a frontal view of the embodiment of FIG. 5A with screen extended.
Figure 5C:
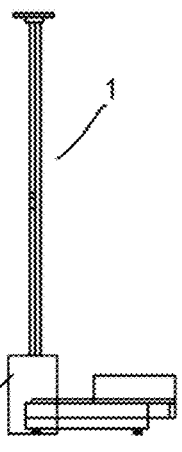
FIG. 5C illustrates a left side view of the embodiment of FIG. 5A with sled and screen extended.
Figure 5D:
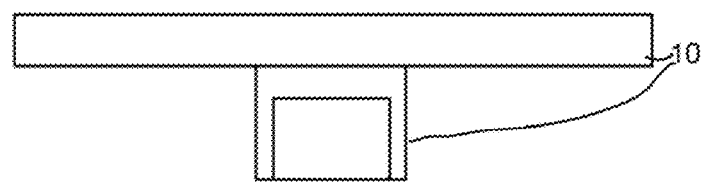
FIG. 5D illustrates a top view of the embodiment of FIG. 5A with screen extended.
Figure 5E:
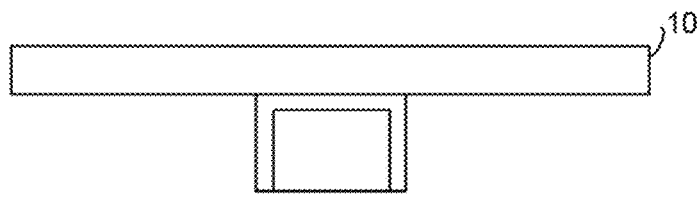
FIG. 5E illustrates a top view of the embodiment of FIG. 5A.
Figure 5F:
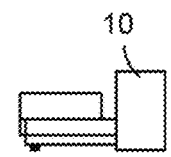
FIG. 5F illustrates a left side view of the embodiment of FIG. 5A with sled and screen retracted.
Figure 5G:
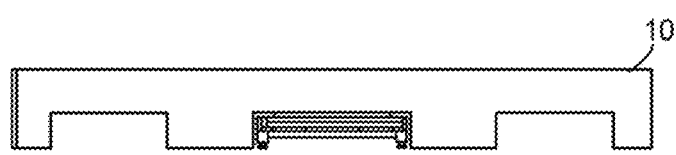
FIG. 5G illustrates a frontal view of the embodiment of FIG. 5A with screen retracted.
Figure 5H:
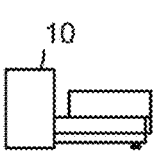
FIG. 5H illustrates a left side view of the embodiment of FIG. 5A with sled and screen retracted.
Figure 6A:
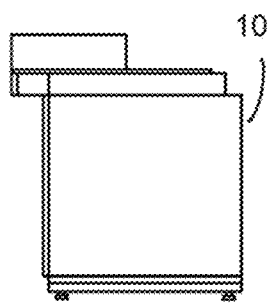
FIG. 6A illustrates a left side view of the embodiment of FIG. 4A with sled extended.
Figure 6B:
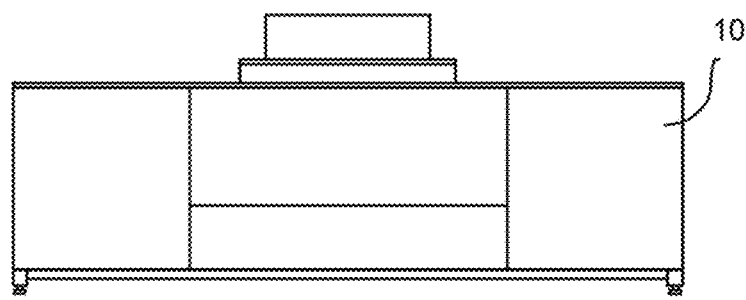
FIG. 6B illustrates a frontal view of the embodiment of FIG. 4A.
Figure 6C:
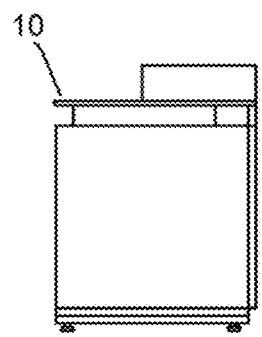
FIG. 6C illustrates a right-side view of the embodiment of FIG. 4A with sled retracted.
Figure 6D:
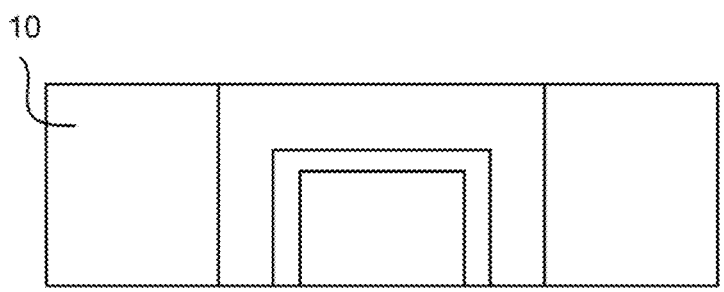
FIG. 6D illustrates a top view of the embodiment of FIG. 4A with sled retracted. extended.
Figure 7A:
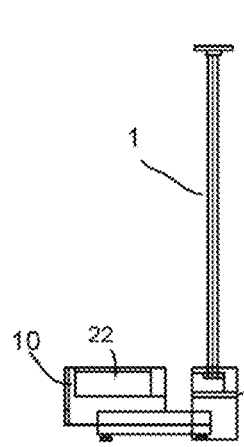
FIG. 7A illustrates a left side view of a credenza system embodiment of the present invention with sled and screen extended.
Figure 7B:
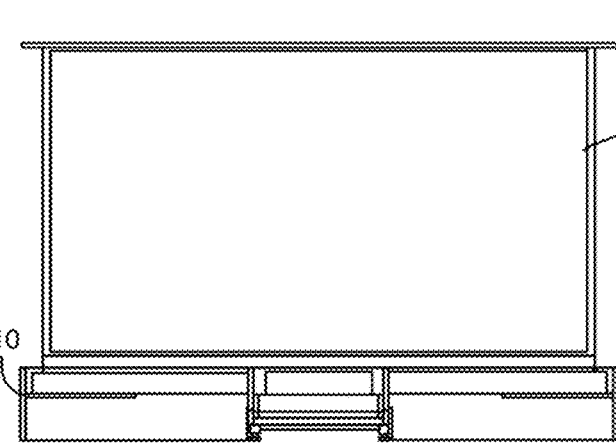
FIG. 7B illustrates a frontal view of the embodiment of FIG. 7A with screen extended.
Figure 7C:
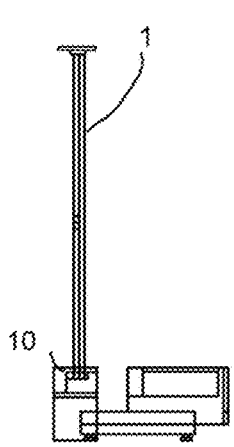
FIG. 7C illustrates a left side view of the embodiment of FIG. 7A with sled and screen extended.
Figure 7D:
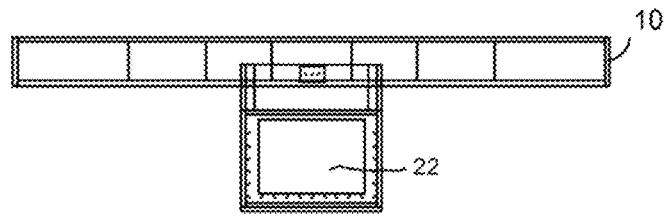
FIG. 7D illustrates a top view of the embodiment of FIG. 7A with screen extended.
Figure 7E:
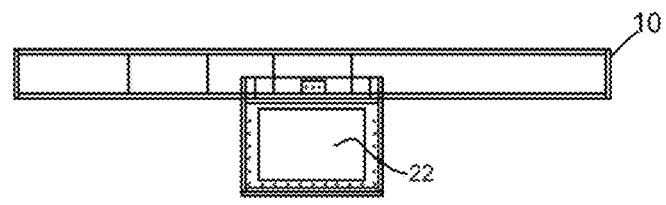
FIG. 7E illustrates a top view of the embodiment of FIG. 7A.
Figure 7F:
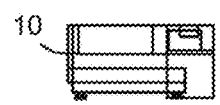
FIG. 7F illustrates a left side view of the embodiment of FIG. 7A with sled and screen retracted.
Figure 7G:
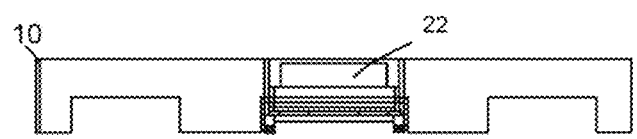
FIG. 7G illustrates a frontal view of the embodiment of FIG. 7A with screen retracted.
Figure 7H:
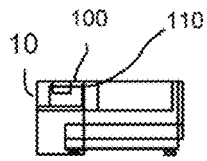
FIG. 7H illustrates a left side view of the embodiment of FIG. 7A with sled and screen retracted.
Figure 8A:
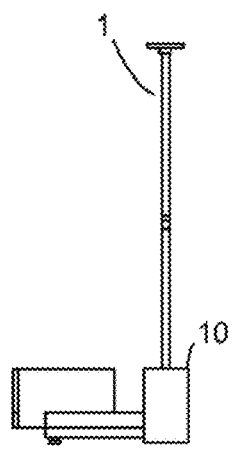
FIG. 8A illustrates a left side view of the embodiment of FIG. 7A with sled and screen extended.
Figure 8B:
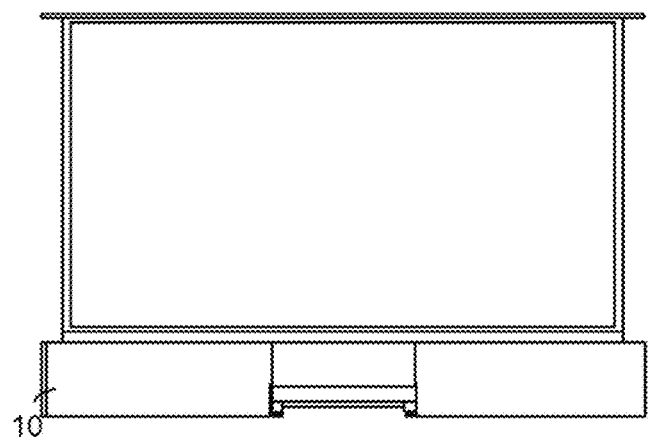
FIG. 8B illustrates a frontal view of the embodiment of FIG. 7A with screen extended.
Figure 8C:
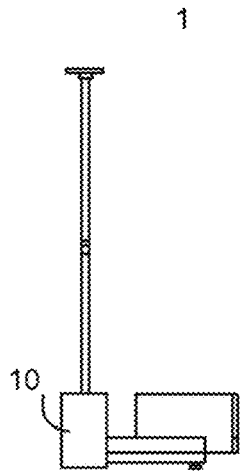
FIG. 8C illustrates a left side view of the embodiment of FIG. 7A with sled and screen extended.
Figure 8D:
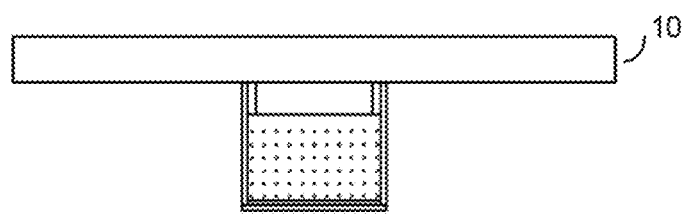
FIG. 8D illustrates a top view of the embodiment of FIG. 7A with screen extended.
Figure 8E:
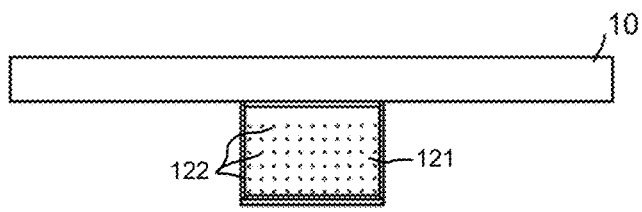
FIG. 8E illustrates a top view of the embodiment of FIG. 7A.
Figure 8F:
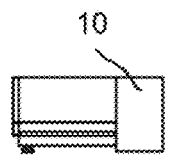
FIG. 8F illustrates a left side view of the embodiment of FIG. 7A with sled.
Figure 8G:
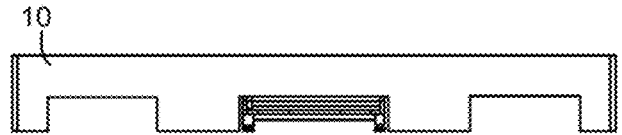
FIG. 8G illustrates a frontal view of the embodiment of FIG. 7A with screen retracted.
Figure 8H:
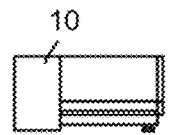
FIG. 8H illustrates a left side view of the embodiment of FIG. 7A with sled and screen retracted.

AEGIS AV Cabinets has developed a completely universal solution (credenza/cabinet) designed to accommodate all Ultra Short Throw (UST) projectors in production, and is completely upgrade-able to technology and design advancements in projection. (Example: when 8K projection is replaced by 8K Projection, the universal UST compartment is able to house the new projector)

The current solution is a credenza with a hole cut out of the top of it that is the exact dimensions of the projector going in it. They do not have any cooling, and do not protect the projector from dust intake. If the customer wants to achieve more than 100-inch projection, the cabinet may have to be pulled substantially away from the wall.

A universal cabinet may be designed to accommodate all the ultra-short throw (UST) projectors in production. The UST projector compartment is deep, and may have a cross drilled ventilated floating adjustable shelf that can move in XYZ direction anywhere in the compartment. The UST compartment itself is connected to an actuator 100, and can slide out of the cabinet for longer throw ratios onto 100+ inch screens.

The UST compartment may be completely enclosed, and may have an ultra-low iron tempered and polished pane of glass over it (as shown as transparent top in FIG. 1H, et seq.). The glass may have a very low iron, making it extremely transparent. The image may be shot through the glass, onto the screen above.

The UST compartment may be also equipped with a digitally controlled and filtered cooling system, may have two intake fans 43, as well as two exhaust fans 44, and may be completely self-monitoring. All gaps between the glass and door openings have weather stripping along the edges to keep dust from being able to enter the compartment. Maintaining a pristine environment inside the UST compartment can double the life span of equipment inside, and ensure it operates at its peak performance during its lifespan.

The UST compartment may also incorporate a safety feature designed to prevent injury when the UST compartment is closing. The connection between the actuator 100 and the UST compartment mounting plate may be connected by a low weight magnet, such as a 10-pound magnet, and may be designed to disengage the actuator when sensing any tension, thus eliminating the possibility of injury to adults or children's hands and fingers.

In preferred embodiments, the UST compartment may be used with five different styles of cabinet. 1) Floor Standing designed to work with external screens. 2) Floor Standing designed to work with internally located rising screens. 3) Wall Mounted. 4) Credenza mounted. 5) Over the fireplace.

A universal cabinet that may be designed to accommodate many varied designs of USTs. A UST projector compartment may be deep, and may have a cross-drilled ventilated floating adjustable shelf that can move in XYZ direction anywhere in the compartment. The UST compartment itself may be connected to an actuator 100, and can slide out of the cabinet for longer throw ratios onto 100+ inch screens.

The UST compartment may be completely enclosed, and may have an ultra-low iron tempered and polished pane of glass over it (as transparent top 70). The glass may have a very low iron, making it light and extremely transparent. The image may be shot through the glass, onto the screen above.

The UST compartment may be also equipped with a digitally controlled and filtered cooling system, may have two intake fans, as well as two exhaust fans, and may be completely self-monitoring. All gaps between the glass and door openings have weather stripping along the edges to keep dust from being able to enter the compartment. Maintaining a pristine environment inside the UST compartment can double the life span of equipment inside, and ensure it operates at its peak performance during its lifespan.

The UST compartment also may have a safety feature designed to prevent injury when the UST compartment is closing. The connection between the actuator 100 and the UST compartment 11 mounting plate may be connected by a 10 lb. magnet, and may be designed to disengage if there is any tension, thus eliminating the possibility of injury to adults or children's hands and fingers.

The sliding UST compartment allows for the cabinet to be only two inches away from the wall and the UST compartment expands out to a programmed position to accommodate projecting images onto 100+ inch screens above.

Each UST compartment may include a cross-drilled and ventilated floating shelf that can be adjusted in XYZ direction inside the compartment to make easy quick adjustments. The holes drilled in the shelf are designed for the projector to be able to breath in every direction without obstructing ventilation.

The UST compartment may have a low iron pane of glass over the projector to make it more discrete and hidden, the transparent top 70 serving to protect the UST while not obstructing the image or color of the projected image passing through the transparent top in any way.

The UST compartment may have a standard digitally controlled and monitored filtered cooling system 41 that sucks in clean air through two intake fans, and may be exhausted out with two other fans. Customer can set temperature triggers for when to start cooling, and also include a smart featured designed to start fans at a lower RPM before the rigger, and will ramp up RPMs as the temperature moves closer to the temperature threshold chosen. Filters easily pop off, can be cleaned in a sink, dried with a paper towel, and re used.

The UST compartment may be enclosed with weather stripping along all the door openings and gaps to prevent dust from being sucked in by the projector, or the UST compartment exhaust fans.

The UST compartment may be completely universal for all residential UST projectors in production, and when newer UST projectors come out, and older models become obsolete, the UST compartment preferably accommodates new designs, shapes and sizes (within reason).

Components may include:
1. 21-inch drawer slider assembly (Blum)
2. ¾ medium density fiber core with high pressure laminate, or maple veneer wood
3. Four 6-inch cooling fans with filters and digitally controlled thermostat (AC Infinity)
4. ¼-inch low iron tempered and polished glass for transparent top
5. ⅛- and ¼-inch foam weather stripping
6. Soft open lid stays (such as those provided by SUGATSUNE)
7. Two 90-degree flap hinges (such as those provided by BLUM)
8. 250 Lb. actuator, remote, and controller box (NEXUS 21)
9. 2×2¼-inch steel plate
10. 10 lb. magnet
11. Fifteen connectors (as provided by KNAPP)
12. Four 4-inch leg levelers
13. One magnetic door latch
14. 3M VHB Adhesive tape
15. floor standing with 100, 120, 150 rising screens.
16. 12"-16" chain actuator
17. Linear actuator with 12"-16" of travel The credenza may be first constructed and connected to its frame and base. After the drawer slides are installed and screwed into its base and side walls of the middle section.

The UST compartment pieces are cut, edge banded, and assembled using snap together connectors (such as those provided by KNAPP). The CNC machine may use a specially designed bit to routed paths in the wood. Connectors are screwed to the edges of the connecting parts, and parts are snapped together.

The connectors allow play so the parts can slide and be adjusted. Once the UST compartment is aligned, joints that are hidden get nailed for a firm hold on all the connections of the UST compartment panels.

A 2-inch by 2-inch metal plate may be screwed to a mount that may be hammered (rubber mallet) into a rectangular hole in the floor of the UST compartment and meets with a second layer that connects to the actuator 100. Once aligned, nails are put in to hold its place.

UST compartment may be then placed onto the drawer slides and locked into position using the drawer connectors from the drawer slider assembly mounted at the front corners under the UST compartments belly.

Thermostat 51 and cooling fans 41 are installed and wired. ⅛th- and ¼-inch peal and stick weather stripping may be applied to the front and top open edges of the cabinet.

Soft open lid stays are screwed into pre drilled holes in the inside walls of the UST compartment. ninety-degree flap hinges are installed in pre drilled holes. Door may be attached to the flap hinges, and the soft open lid stays are screwed to the tailgate style door. Latch magnet may be installed and tested with door. Magnets may be attached to the actuator 100 mounting plate using their own magnetic strength and are held using 3M VHB adhesive tape. Actuator, IR box, and controller, and other similar devices, may be mounted to the credenza shelf the slides and UST compartment are connected to. Drawer may be closed and makes contact with the magnet.

Before or after glass may be installed, the compartment may be function-tested, and adjustments are made where needed. T-nuts may be hammered into the pre-drilled holes in the corners of the adjustable shelf. Legs levelers 14 are then screwed in and the shelf may be inserted into the UST compartment.

The actuator 100 for the UST compartment 11 can be controlled by radio frequency and/or infrared (IR) triggers, and can be integrated with all the major home automation controllers on the market. The device can be opened and closed using the IR remote control, tablet or phone connected to the customers home automation controller, or using voice assistants like AMAZON Alexa and GOOGLE Home.

After the projector is set up within the furniture, the UST compartment may be slid out to the desired position, a LAN connector may be plugged into the controller, and the drawer may be programmed to only slide out to that position from then on unless the connector is removed from the controller.

When the motion to open is triggered, the actuator motor 101 may rotate a screw in the actuator 100 to slowly push the metal plate and the UST compartment forward with it. The Slide drawer is preferably programmed to stop at the pre-programmed spot. When the command to close the compartment may be triggered, the UST compartment may return back to its original flush closed position.

In the event that a child or someone get their hand or fingers caught in the gaps of the UST slider and the outside cabinet, a ten-pound magnet may be designed to break away from the UST compartments metal plate to prevent injury. The actuator will still continue to retract, and when it gets to its full position, it hits a specially designed lip that brings the mounting plate and magnets upright. To re-engage, gently slide the UST compartment shut, and the compartment may be re engaged and re aligned.

The UST compartment cooling system may be controlled by a digitally controlled thermostat 51. Customers can choose the temperature threshold for when they want the fans to cool. There may be also a smart mode that turns the fans on before the trigger at a lower RPM to start moving air through the compartment, then gradually ramps up the RPM's as the temperature climbs to full speed when it hits the threshold.

Attached filters easily pop off with no tools, can be cleaned in the sink, dried, and re used. You can also set temperature alarms to notify of when filters need to be cleaned.

Tailgate style door opens and close and may be held closed using a magnetic latch. When open, the adjustable shelf may be raised and lowered using the four leg levelers 14, and can slide in any direction in the cabinet by hand for projector image adjustments.

Every aspect of the design is important to achieve proper calibration, safety, and overall function. The only element that could be added would be a weight threshold on the actuator that would reverse the motor when it hits the 10 lbs. of pressure if someone got a hand or finger caught in the gaps during closing. This could be added, but it would not be as fool proof as the magnetic break away design.

Referring to FIG. 1, an ANDROMEDA version is shown. Screen 1 may next into credenza 10. Motorized sled 20 may be set on actuator 100 to extend out of credenza 10 backwards into room, when credenza 10 set along forward wall, with rea of credenza facing wall. Screen may include anti-pinch hook-and-loop fastener 6. Credenza 10 may include amphitheater USA compartment 11 to allow door wide projection. Amphitheater 30 includes angled side walls 31 and back wall 32 to allow for light path of rays 24 to from UST 22 to screen 1. Cassette 11 is hidden in the credenza under black glass 12 that is mounted to the top of the screen 1. Actuator 100 is fixed onto a surface 33 of the credenza, and extends via linear or chain link 102 to sled 20. AS an alternative, a worm-drive screw may be used to modify the horizontal and/or vertical path of the compartment and/or actuator. A magnetic plate 110 may mate with sled 20, as between sled end/back and actuating link to allow for safety release.

Figures demonstrate vents 40 and controllers 50 to allow for separate climate control of each compartment in the credenza unit 10. Vents 40 may be either/or intake vent 48 or exhaust vent 49, either interchangeably passive or providing the dual role, or mechanized as with a fan. Credenza being referred to here generally as a furniture or system capable of maintaining, supporting and providing access to components described herein. Sled 20 includes raised plate stand 21 with apertures to allow for air flow around projector. Raised plate stand 21 may serve as raised support 121 to support the UST. Raised support 121 preferably includes apertures 122, such as an array of apertures, as shown. Vents 40 provide for incoming through intake vent 48 or outgoing airflow through exhaust vent 49, preferably outgoing. Air exhaust lines 42 are show for items that are placed above the lowest level to run in horseshoe pattern causing a draft across the compartment to aide in cooling/air circulation. Bottom vents 45 are placed on the lower surface of the compartment(s) and are filtered, preferably by HEPA, to allow inflow of air to be drawn and exhausted out of vent 40. Tail gate doors 60 may be opened to provide access to components within compartments.

Figure 9A:
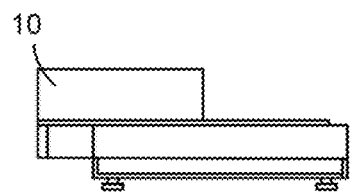
FIG. 9A illustrates a left side view of a projector sled of an embodiment of the present invention with sled extended.
Figure 9B:
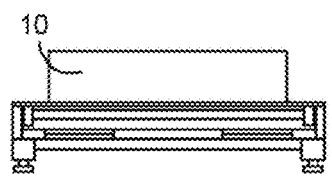
FIG. 9B illustrates a rear view of the embodiment of FIG. 9A.
Figure 9C:
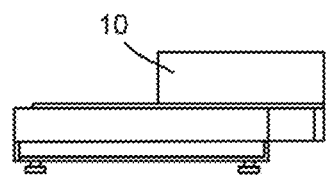
FIG. 9C illustrates a right-side view of the embodiment of FIG. 9A with sled extended.
Figure 9D:
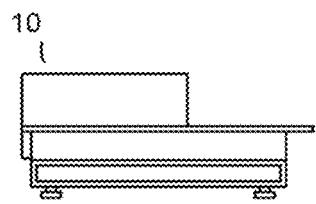
FIG. 9D illustrates a left side view of the embodiment of FIG. 9A with sled retracted.
Figure 9E:
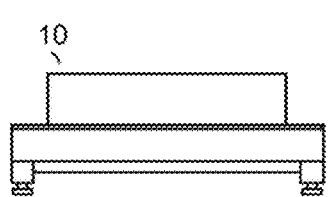
FIG. 9E illustrates a front view of the embodiment of FIG. 9A.
Figure 9F:
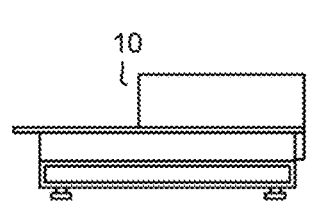
FIG. 9F illustrates a right-side view of the embodiment of FIG. 9A with sled retracted.
Figure 10A:
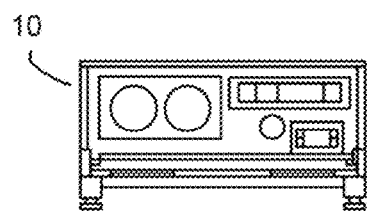
FIG. 10A illustrates a rear view of a projector sled of an embodiment of the present invention.
Figure 10B:
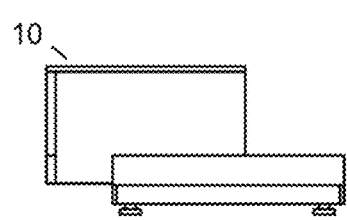
FIG. 10B illustrates a left side view of the embodiment of FIG. 10A with sled extended.
Figure 10C:
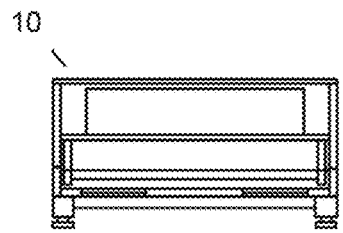
FIG. 10C illustrates a partial cut away rear view of the embodiment of FIG. 10A.
Figure 10D:
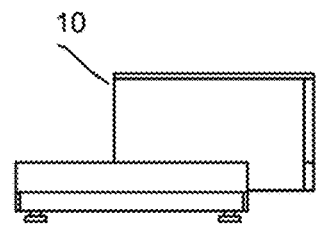
FIG. 10D illustrates a right-side view of the embodiment of FIG. 10A with sled extended.
Figure 10E:
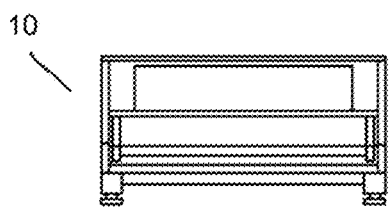
FIG. 10E illustrates a partial cut away frontal view of the embodiment of FIG. 10A.
Figure 10F:
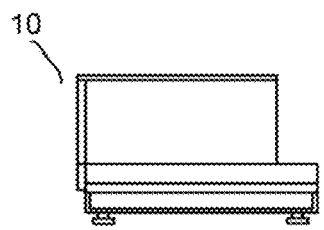
FIG. 10F illustrates a right-side view of the embodiment of FIG. 10A with sled retracted.
Figure 10G:
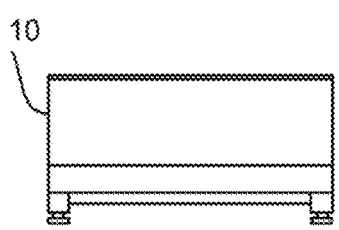
FIG. 10G illustrates a front view of the embodiment of FIG. 10A.
Figure 10H:
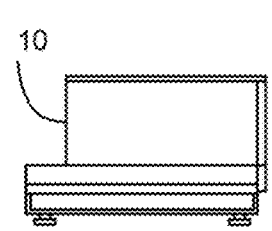
FIG. 10H illustrates a right-side view of the embodiment of FIG. 10A with sled retracted.
Figure 11A:
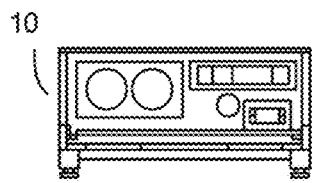
FIG. 11A illustrates a rear view of a projector sled of an embodiment of the present invention.
Figure 11B:
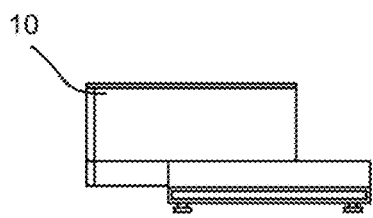
FIG. 11B illustrates a left side view of the embodiment of FIG. 11A with sled extended.
Figure 11C:
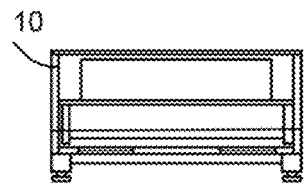
FIG. 11C illustrates a partial cut away rear view of the embodiment of FIG. 11A.
Figure 11D:
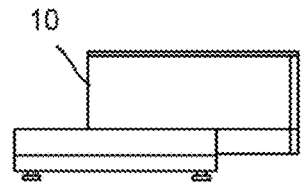
FIG. 11D illustrates a right-side view of the embodiment of FIG. 11A with sled extended.
Figure 11E:
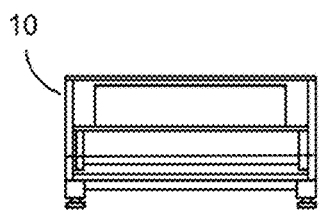
FIG. 11E illustrates a partial cut away frontal view of the embodiment of FIG. 11A.
Figure 11F:
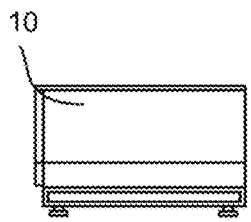
FIG. 11F illustrates a right-side view of the embodiment of FIG. 11A with sled retracted.
Figure 11G:
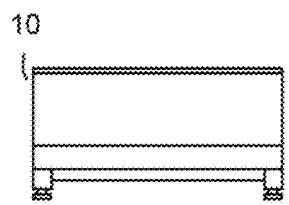
FIG. 11G illustrates a front view of the embodiment of FIG. 11A.
Figure 11H:
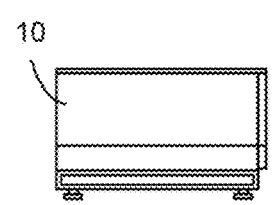
FIG. 11H illustrates a right-side view of the embodiment of FIG. 11A with sled retracted.
Figure 14A:
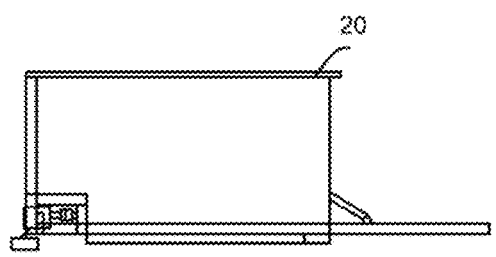
FIG. 14A illustrates a right-side view of a compartment sled of an embodiment of the present invention. with the sled retracted.
Figure 14B:
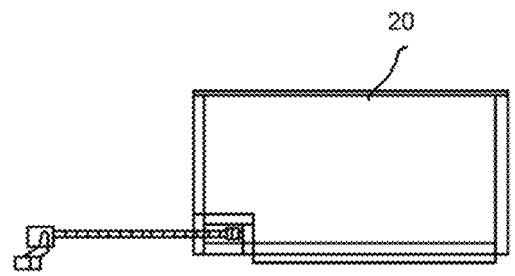
FIG. 14B illustrates a partial cutaway frontal of the embodiment of FIG. 14A.
Figure 14C:
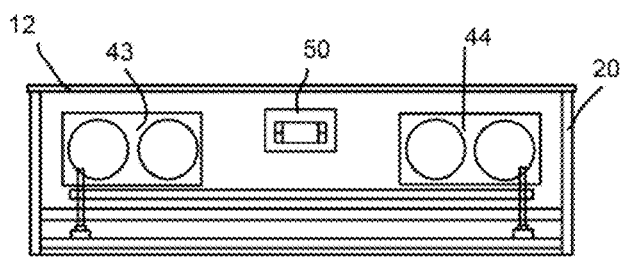
FIG. 14C illustrates a partial cutaway top view of the embodiment of FIG. 14A.
Figure 14D:
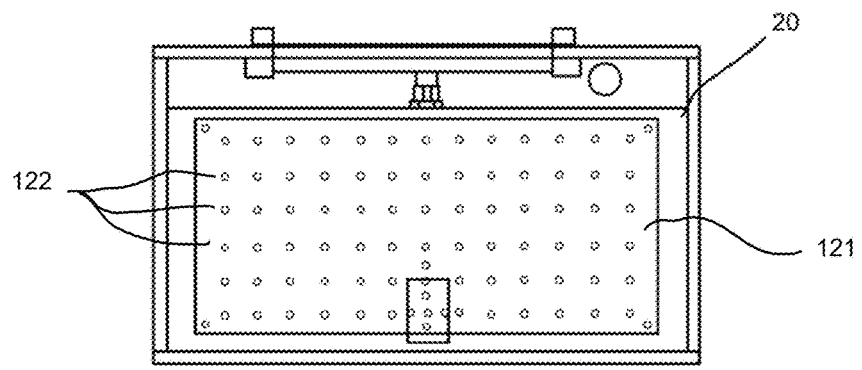
FIG. 14D illustrates a right-side view of the embodiment of FIG. 14A with the sled extended.

Referring to FIG. 9, et seq. magnetic disengage for safety is provided with actuator 100 and UST. Preferably the safety magnet is set to release at 10-17 lbs. of pressure to prevent serious injury. Black glass surface 12 is provided, tempered polished with grey screen printed to blend in, printed black underneath. Infinity glass is preferred to be exposed at upper end of sled and set to provide no gap between the glass and the cassette sleeve a.k.a. sled.

Intake vents are preferably filtered, and may be repurposed from electronics, such as a 120 mm intake fans 43 with snap on reusable air filters. Exhaust fan 44 may be set.

I claim:

1. A credenza for the support, storage, and presentation of audio-visual media on a projection screen, said credenza comprising:
   a. a leg support;
   b. a sled comprising a sealed compartment with the exception of vents and exhausts, a transparent top; a raised support comprising apertures; and an exhaust vent, an intake vent;
   c. an actuator coupled to said credenza and coupled with said sled, said actuator comprising a motor and adapted to move said sled from a first closed position and a second extended position, whereby said sled is moved horizontally away from a projection screen; and d. an ultra-short throw projector mounted in said sled said ultra-short throw projector directing light upwards through said transparent top.

2. The credenza of claim 1 further comprising an amphitheater top with angled back wall, and complementary angled side walls comprising an amphitheater shape.

3. The credenza of claim 1 comprising a retracted display screen.

4. The credenza of claim 1 wherein said credenza is mounted to a wall.

5. A method of displaying an audio and/or visual program comprising the steps of:

a. mounting an ultra-short throw projector in a sled, the sled having a transparent top;

b. actuating the sled horizontally away from a screen while maintaining a support furniture in location relative a projection screen and/or wall;

c. locking the sled in a predetermined position.

6. The method of claim 5 further comprising the step of returning the sled horizontally towards the screen.

7. The method of claim 5 whereby the sled comprises apertures.

8. The method of claim 5 whereby the sled comprises a raised platform having apertures.

9. The method of claim 5 whereby said step of actuating is conducted via an actuator coupled to a credenza and the sled.

10. The method of claim 5 further comprising the step of directing light upwards from the ultra-short throw projector.

11. The method of claim 10 whereby the step of directing comprises directing light through the transparent top.

12. The method of claim 10 whereby the step of directing comprises directing light onto a display screen.

13. The method of claim 5 whereby the sled includes an amphitheater top with angled back wall, and complementary angled side walls.

* * * * *